United States Patent [19]

Sugisawa et al.

[11] Patent Number: 4,732,774

[45] Date of Patent: Mar. 22, 1988

[54] PROCESS FOR PREPARING TOFU CHARGED INTO A CONTAINER

[75] Inventors: Ko Sugisawa; Yasushi Matsumura; Koji Sengoku; Yoshiaki Nagatome, all of Nara, Japan

[73] Assignee: House Food Industrial Company Limited, Higashiosaka, Japan

[21] Appl. No.: 14,083

[22] Filed: Feb. 3, 1987

Related U.S. Application Data

[63] Continuation of Ser. No. 740,333, Jun. 3, 1985, abandoned.

[30] Foreign Application Priority Data

Jul. 4, 1984 [JP] Japan ................................ 59-138480

[51] Int. Cl.[4] .......................... A23L 1/20; A23J 3/00
[52] U.S. Cl. .................................. 426/634; 426/656; 426/598
[58] Field of Search ...................... 426/656, 634, 598

[56] References Cited

U.S. PATENT DOCUMENTS

| | | | |
|---|---|---|---|
| 4,537,789 | 8/1985 | Sugisawa et al. | 426/634 |
| 4,678,677 | 7/1987 | Sugisawa et al. | 426/634 |

FOREIGN PATENT DOCUMENTS

| | | | |
|---|---|---|---|
| 0142590 | 5/1985 | European Pat. Off. | 426/634 |
| 0069847 | 6/1978 | Japan | 426/598 |
| 0002358 | 1/1979 | Japan | 426/598 |
| 0043741 | 1/1980 | Japan | 426/634 |
| 0023574 | 6/1981 | Japan | 426/634 |
| 56-39866 | 9/1981 | Japan. | |

*Primary Examiner*—Joseph Golian
*Attorney, Agent, or Firm*—Oblon, Fisher, Spivak, McClelland & Maier

[57] ABSTRACT

This invention provides a process for preparing tofu charged into a container, characterized in that polyphosphate and casein are added to soybean milk, and the soybean milk thus prepared is coagulated by heat in a packaging container after homogenation thereof. As an effective delayed coagulation effect can be achieved according to such process, the process can be easily applied industrially. The tofu thus prepared is of good texture, has a good taste and is high in quality.

4 Claims, No Drawings

PROCESS FOR PREPARING TOFU CHARGED INTO A CONTAINER

This application is a continuation of application Ser. No. 740,333, filed on June 3, 1985, now abandoned.

BACKGROUND OF THE INVENTION

1. Field of the Invention

The present invention relates to a process for preparing tofu charged into a container, that is useful for preparing what is called "charged Tofu" or "packed Tofu" of the type prepared by the coagulation of soybean milk by heating after soybean milk including a coagulant etc. have been charged into a container and sealed therein. More particularly, the present invention relates to a new effective process for preparing tofu charged into a container when a rapid-acting coagulant such as magnesium chloride is used.

2. Description of the Prior Art

In the preparation of charged tofu, much effort has gone into realizing delayed coagulation reaction so as to avoid the trouble caused by rising viscosity of the soybean milk in the step of transferring the soybean milk including a coagulant to the packaging container to charge it therein, the step of charging it into a packaging container and other steps.

Therefore, there is generally used a delayed-acting coagulant such as δ-gluconic lactone (hereafter referred to as G.D.L) which can act slowly as a coagulant in the soybean milk. However, when such a delayed-acting coagulant is used, it is necessary to bring the temperature of the soybean milk down to near room temperature. Moreover, it is generally agreed that tofu prepared by using G.D.L. is less tasty than tofu prepared by using magnesium chloride.

On the other hand, when a rapid-acting coagulant such as magnesium chloride, calcium sulfate etc. is used for preparing tofu, it is known to delay coagulation by using a polyphosphate as a coagulation delaying agent together with said rapid-acting coagulant. But since the coagulation reaction can only be delayed for 1 to 2 minutes by said method, the viscosity of the soybean milk rises after said time and therefore, trouble occurs in the charging procedure.

Japanese Patent Public Disclosure No. 133653/1978 discloses a method in which casein is used as a dispersing and coating agent for coagulant in the form of fine particles. More specifically, in the method disclosed, a coagulant in the form of particles which have been coated with casein is added to soybean milk in order to restrict the solubility rate of the coagulant in the soybean milk, and delayed coagulation of soybean milk is obtained as a result. However, said delayed coagulation effect is inherently limited and therefore, sufficient delayed coagulation effect cannot be obtained by said method.

Furthermore, with conventional methods, various troubles occur in the steps of preparing the tofu charged into a container. At the same time, it is observed that the tofu thus produced loses water, which degrades the quality of the tofu in that it does not have a smooth texture to the tongue.

It is considered that a major cause for this is that the soybean milk is first partially coagulated by the coagulation reaction, the soybean milk thus coagulated is broken during the transferring step, charging step etc., and further coagulation thereafter proceeds by heating.

SUMMARY OF THE INVENTION

Under such circumstances, the inventors conducted exhaustive studies toward the solution of these numerous problems in the conventional process for preparing tofu charged into a container and accomplished the present invention on the basis of the following discovery. Namely, it was discovered that when soybean milk is treated in such manner as to satisfy two conditions, the first condition being the addition to the soybean milk of a polyphosphate and at least one substance selected from the group consisting of casein, casein salts and complexes consisting mainly of casein and the second condition being the subjection of said mixture to homogenizing treatment, there is obtained a delayed coagulation effect of a sufficient degree for practical application to a process for preparing tofu charged into a container even when rapid-acting coagulant is used. That is, when said two conditions are met there can be obtained tofu charged into a container having good taste without removal water included in the tofu.

The principal object of this invention is to provide a new process for preparing tofu charged into a container wherein sufficient delayed coagulation effect can be obtained and troubles caused by rising viscosity of the soybean milk in the transferring step, charging step etc. can be avoided when a coagulant, even a rapid-acting coagulant, is added to the soybean milk.

Another object of this invention is to provide a process for preparing tofu charged into a container having good taste and good texture without removal of the water included in the tofu.

Another object of this invention is to provide a simple process for preparing such tofu that can be easily applied industrially.

These and other objects of this invention will be clear from the following description.

DESCRIPTION OF THE PREFERRED EMBODIMENTS

In the process of this invention, soybean milk prepared by conventional methods is preferably used as a starting material. For example, whole soybean, dehulled soybean or defatted soybean is used as a starting material and it is treated according to the following series of processes: starting material→immersion in water (not conducted in the case of defatted soybean)→addition of water→grinding (to form a shurry called "go")→heating→isolation of soybean lees→soybean milk.

In said process, it is desirable to apply heat treatment to the "go", such as boiling, for about 30 seconds to 10 minutes at a temperature of about 80° to 100° C. Such heating is desirable for the reason that it causes a moderate denaturation of the soybean protein whereby the water retention of the final tofu can be enhanced and the tofu becomes agreeable to the palate.

However, if desired, the heating process may be omitted and the "go" can be directly subjected to the separation process to form soybean milk.

It is possible in the process of this invention to use powdered soybean milk prepared by subjecting soybean milk prepared as described above to a spray-drying technique or the like. In this case, the powdered soybean milk is preferably used in the form of a solution prepared by dispersing and dissolving it into either cold or hot water.

In the process of this invention, as another type of starting material, there can be used an aqueous solution of isolated soybean protein instead of said soybean milk. The aqueous solution of the isolated soybean milk can be obtained by a conventional process which comprises, for example, adding a precipitant such as an acid to soybean milk to precipitate soybean protein and then redispersing and redissolving the precipitate in water.

The dry solids concentration in the soybean milk or the aqueous solution of isolated soybean protein (which are collectively called "soybean milk etc." hereunder) used in the process of this invention is not particularly limited.

The standard (but nonlimitative) dry solids concentration of soybean milk is in the range of about 8 to 15%, preferably about 10 to 13% relative to the weight of the soybean milk. It is desirable to use soybean milk having said dry solids concentration to obtain better delayed coagulation effect. The standard (but nonlimitative) dry solids concentration in the aqueous solution of isolated soybean protein, at which better delayed coagulation effect is obtained, is in the range of about 3 to 8%, preferably about 4.5 to 7% relative to the weight of the aqueous solution of isolated soybean protein.

According to the process of the present invention, a polyphosphate, and at least one substance selected from the group consisting of casein, casein salts and complexes consisting mainly of casein (which are collectively called "casein etc." hereunder) are added to said soybean milk etc. This addition can be carried out at the start of the process.

In the process of this invention, as the polyphosphate, there may be used, for example, such as sodium pyrophosphate, sodium hexametaphosphate or sodium tripolyphosphate. These polyphosphates can be used singly or in combination. The polyphosphate is preferably used in an amount (total amount thereof if more than one kind of polyphosphate is used) of 0.05 to 0.4% (relative to the weight of soybean milk etc.), more preferably 0.2 to 0.3% in order to obtain tofu having good taste and sufficient delayed coagulation effect.

Furthermore, when sodium pyrophosphate, sodium tripolyphosphate and hexametaphosphate are used in a ratio of 3 to 7: 2 to 3: 2 to 3, preferable results can be obtained as regards the taste of the tofu thus prepared and the delayed coagulation effect.

In the process of this invention, as the casein salt, there may be used, for example, such as sodium caseinate or calcium caseinate.

By "complex consisting mainly of casein" is meant a complex such as skim milk, which consists mainly of casein and further comprises, milk sugar and milk protein.

In the process of this invention, the amount of casein etc. to be added is not especially limited, but the casein etc. is preferably added in the amount of 0.1 to 1.2% (relative to the weight of soybean milk), more preferably 0.3 to 0.8% in order to obtain better delayed coagulation effect.

Within said range of addition of casein etc., particularly preferable results are obtained as regards the delayed coagulation effect when the casein etc. is added at a ratio of 40:1 to 1.5:1 by weight with respect to the amount of polyphosphate added.

It should be noted that as said polyphosphates and casein etc. do not disperse and dissolve easily in water, it is necessary to first blend and disperse them using a high-speed mixer and then to solubilize them by heating up to between 80° and 90° C.

In the process of this invention, the order of adding the polyphosphate and casein etc. to the soybean milk etc. is not limited, and if desired they can even be added to the soybean milk etc. at the same time.

According to the process of the present invention, the soybean milk etc. to which the polyphosphate and casein etc. have been added is subjected to homogenizing treatment.

In the process of this invention, homogenizing treatment may be conducted by a conventional process which comprises using, for example, a pressure type homogenizer such as a high pressure homogenizer or an impact cell mill, a rolling type homogenizer such as a colloid mill, an ultrasonic type homogenizer, etc.

In the process of this invention, it is preferable to use a high pressure homogenizer. In this case, it is necessary to conduct homogenizing treatment under a pressure of no less than 30 kg/cm$^2$, and the homogenizing treatment is preferably conducted under a pressure of about 50 to 700 kg/cm$^2$, more preferably about 100 to 300 kg/cm$^2$ to obtain sufficient delayed coagulation effect and tofu having good texture and good taste. Said homogenizing treatment can be conducted at one time or it may be repeated from 2 to 3 times.

In the method of the present invention the combination of the addition of said polyphosphate and caseins with said homogenizing treatment synergistically heightens the delayed coagulation effect and results in the production of tofu of excellent quality.

The coagulant used in this invention can be of any type, including the delayed-acting type and the rapid-acting type. Namely, any kind of coagulant can be used. Moreover, the amount of the coagulant is not limited.

Thus, the kind and amount of coagulant can be suitably selected according to the desired hardness of the tofu to be prepared, the dry solids concentration of the soybean milk etc. used, etc. For example G.D.L, which is a delayed-acting coagulant, is used in the standard amount of about 0.15 to 0.5% relative to the weight of the soybean milk etc. preferably about 0.2 to 0.35%, to obtain tofu having good taste and good texture.

If magnesium chloride, which is one of the rapid-acting coagulants, is used as the coagulant it is preferably used in an amount of about 0.3 to 0.8% (relative to the weight of the soybean milk etc.), and if calcium sulfate, which also of the rapid-acting type, is used as the coagulant, it is preferably used in an amount of about 0.2 to 0.6%. Magnesium chloride or calcium sulfate can be used together with G.D.L.

According to this invention, when said rapid-acting coagulant is used, the effects of this invention are particularly manifested making it possible and sufficient delayed to attain delayed coagulation of a level unattainable by conventional processes.

In the process of this invention, said coagulant can be added before or after the homogenizing treatment. However, when said coagulant is added to the soybean milk etc., to obtain adequate delayed coagulation effect and improve the taste of the tofu, it is preferable in advance to adjust the temperature of the soybean milk etc. to between about 0° to 25° C., more preferable between 5° to 10° C. This adjustment is particularly effective when a rapid-acting coagulant is used. It is preferable to add said coagulant to the soybean milk etc. after the homegenizing treatment in order to further improve the delayed coagulation effect of this invention.

In the next step of the process of this invention, the soybean milk etc. to which said coagulant has been added is, by a conventional process, charged into a packaging container, sealed therein and then coagulated by heating to obtain the tofu of this invention.

Any known packaging container can be used in this invention. However, it is preferable to use one made of a heat-resistant material. There are no limits on the shape and size of the packaging container.

In the process of this invention, said coagulation treatment by heating may be carried out by a conventional process. For example, it can be carried out by a treatment such as sterilization with hot water or high temperature-high pressure treatment in a retort.

The conditions of the coagulation treatment by heating can be selected freely in accordance with the kind of coagulant used or the desired degree of product storability. However, the standard heat treatment conditions are a temperature of about 80° to 135° C. and a treatment time of about 5 to 90 minutes.

Generally speaking, when a coagulant which has a low coagulating temperature such as magnesium chloride is employed, there is increased generation of voids known as "su" within the tofu when the soybean milk is rapidly heated to a high temperature. Accordingly, it is desirable to increase the temperature gradually.

As will be clear from the following, tofu having the desired quality can be prepared by the process of this invention.

The present invention will now be illustrated more concretely by referring to the following nonlimitative examples together with comparative examples.

EXAMPLE 1

Whole soybeans were soaked in water and ground after addition of water. The resulting "go" was subjected to steaming treatment and then centrifugal separation to remove the soybean lees. As a result, 2 kg of soybean milk having a dry solids concentration of 11% was obtained.

0.5% of sodium caseinate (relative to the weight of soybean milk; hereinafter the same) was added to the soybean milk after 0.084% of anhydrous sodium pyrophosphate, 0.058% of sodium tripolyphosphate and 0.058% of sodium hexametaphosphate had been added thereto, whereafter, the mixture was mixed and solubilized using high-speed mixer.

Said mixture was homogenized under a pressure of 150 kg/cm$^2$ by a homogenizer and then cooled below 10° C., whereafter 0.5% of magnesium chloride was added to and mixed therewith. Thereafter, the mixture was charged into heat-resistant plastic containers in amounts of 300 g each and sealed.

The mixture was then coagulated by heating in hot water at a temperature of 85° C. for 60 minutes, whereby tofu charged into containers was obtained (Sample A).

COMPARATIVE EXAMPLE 1

A comparative example of tofu charged into a container (Sample B) was prepared by the same procedures as set forth in Example 1 except that sodium caseinate was not added to the soybean milk and homogenizing treatment was not conducted.

COMPARATIVE EXAMPLE 2

A comparative example of tofu charged into a container (Sample C) was prepared by the same procedures as set forth in Example 1 except that sodium caseinate was not added to the soybean milk.

COMPARATIVE EXAMPLE 3

A comparative example of tofu charged into a container (Sample D) was prepared by the same procedures as set forth in Example 1 except that homogenizing treatment was not conducted.

COMPARATIVE EXAMPLE 4

A comparative example of tofu charged into a container (Sample E) was prepared by the same procedures as set forth in Example 1 except that polyphosphate was not added to the soybean milk.

COMPARATIVE EXAMPLE 5

A comparative example of tofu charged into a container (Sample F) was prepared by the same procedures as set forth in Example 1 except that homogenizing treatment was conducted under a pressure of 25 kg/cm$^2$.

EXAMPLE 2

This example was carried out by the same procedures as set forth in Example 1 except that casein was added thereto after 0.5% of magnesium chloride and the same polyphosphate as used in Example 1 were simultaneously added to the soybean milk, and then homogenizing treatment was conducted as soon as the mixing and solubilizing treatment by high-speed mixer was finished. As a result, tofu charged into a container of the present invention was obtained (Sample G).

The delayed coagulation effects in the processes described above were compared by measuring the change in the viscosity of the soybean milk over time after the coagulant was added. The results obtained are shown in Table I.

Furthermore, the properties of the samples obtained above were examined by sensory tests and the properties thereof were compared. The results obtained are shown in Table II.

By "elapsed time" in Table I is meant the elapsed time in minutes from the time when the coagulant was added. By "tofu charged into a container" in Table II is meant tofu charged into a container prepared by using soybean milk that was left to stand for the number of minutes shown in Table II following the time when the coagulant was added to the soybean milk.

The viscosity of the soybean milk was measured at a soybean milk temperature of 10° C. at 60 rpm by a B-type viscometer (rotary bob No. 3) manufactured by Tokyo Keiki Co., Ltd.

TABLE 1

| Process for preparing | Elapsed time | | | | | | |
|---|---|---|---|---|---|---|---|
| | 1 min (cp) | 2 min (cp) | 4 min (cp) | 10 min (cp) | 20 min (cp) | 30 min (cp) | 60 min (cp) |
| Example 1 | 34 | 36.8 | 41.4 | 57.8 | 88.7 | 108 | 130 |
| Example 2 | 37.4 | 38.6 | 49.7 | 63.6 | 94 | 112 | 140 |
| Comparative example 1 | 400 | — | — | — | — | — | — |
| Comparative example 2 | 65 | 117.5 | 170 | 300 | — | — | — |
| Comparative | 80 | 130 | 250 | 416 | — | — | — |

TABLE 1-continued

| Process for preparing | Elapsed time | | | | | | |
|---|---|---|---|---|---|---|---|
| | 1 min (cp) | 2 min (cp) | 4 min (cp) | 10 min (cp) | 20 min (cp) | 30 min (cp) | 60 min (cp) |
| example 3 Comparative example 4 | 370 | 720 | — | — | — | — | — |
| Comparative example 5 | 67 | 115 | 210 | 360 | — | — | — |

TABLE II

| Sample | Elapsed time (minutes) | Sensory test result |
|---|---|---|
| A Present invention | 60 | little water removed from tofu, suitable springiness, good texture |
| G Present invention | 30 | little water removed from tofu, suitable springiness, good texture |
| B Comparative example | 1 | brittle to the palate, no springiness, much water removed from tofu |
| C Comparative example | 4 | much water removed from tofu, no springiness, disagreeable to the palate |
| D Comparative example | 4 | brittle to the palate, no springiness, much water removed from tofu |
| E Comparative example | 1 | brittle to the palate, no springiness, much water removed from tofu |
| F Comparative example | 4 | much water removed from tofu, no springiness, disagreeable to the palate |

As is obvious from Table I, according to the process of the present invention, coagulation of the soybean milk can be effectively delayed for a long period. At the same time, as is obvious from Table II, tofu charged into a container having better quality than that of the comparative examples can be obtained even if the tofu is prepared using soybean milk that has been left to stand for a long period after the coagulant was added thereto.

In the tofu prepared as described above, when the soybean milk is heated, coagulation thereof starts and proceeds moderately thanks to the delayed coagulation effect. Accordingly, water included in the tofu prepared according to the process of the present invention is scarcely removed therefrom and, the Tofu is smooth to the palate, has good taste and is high in quality.

What is claimed is:

1. A process for preparing tofu charged into a container, which comprises:
    (a) adding polyphosphate and at least one substance selected from the group consisting of casein, casein salt and complexes consisting mainly of casein to a solution selected from the group consisting of soybean milk and aqueous solutions of isolated soybean protein, wherein the amount of said polyphosphate and said substance is 0.05–0.4%, and 0.1–1.2% relative to the weight of the solution, respectively;
    (b) homogenizing the mixture under a pressure of 100 to 300 $kg/cm^2$ by a pressure-type homogenizer;
    (c) adding a coagulant to the mixture; and
    (d) coagulating the mixture by heating the same after it has been charged into a packaging container and sealed therein.

2. The process as set forth in claim 1 wherein pyrophosphate, tripohyphosphate and hexametaphosphate are used in a ratio of 3 to 7: 2 to 3: 2 to 3 by weight.

3. The process as set forth in claim 1 wherein said coagulant is magnesium chloride and the amount thereof added is about 0.3 to 0.8 relative to the weight of said solution.

4. The process as set forth in claim 1 wherein said coagulant is calcium sulfate and the amount thereof added is about 0.2 to 0.6% relative to the weight of said solution.

* * * * *